United States Patent [19]

Fall

[11] Patent Number: 4,689,881

[45] Date of Patent: Sep. 1, 1987

[54] HEAD AND MAGAZINE LOADER ASSEMBLY

[76] Inventor: James C. Fall, 9531 Melvin Ave., Northridge, Calif. 91342

[21] Appl. No.: 883,523

[22] Filed: Jul. 8, 1986

[51] Int. Cl.$^4$ .......................... B23Q 7/10; B21F 7/00; B21F 15/04

[52] U.S. Cl. ........................................ 29/813; 81/901; 140/119.122

[58] Field of Search ............... 140/122, 118, 119, 123; 81/901; 29/813

[56] References Cited

U.S. PATENT DOCUMENTS

| | | | |
|---|---|---|---|
| 295,880 | 10/1884 | Lorillard | 81/901 |
| 3,030,984 | 4/1962 | Vogt et al. | 140/119 |
| 2,857,792 | 10/1958 | McNish | 140/123 |
| 3,024,682 | 3/1962 | Finkle | 81/901 |
| 4,413,660 | 11/1983 | Conrad | 140/119 |

*Primary Examiner*—Howard N. Goldberg
*Assistant Examiner*—Steven Nichols
*Attorney, Agent, or Firm*—Frank L. Zugelter

[57] ABSTRACT

This invention is found in the construction or configuration of the elements in the head of a driver apparatus utilized in securing screws in wooden members and to its relationship with a wire magazine loader mounted to the driving apparatus itself. The invention comprises a head member having a top and an outer wall which encompasses a cavity that forms crossed passageways extending to the top, openings in the outer wall communicating with cavity, atmosphere and magazine loader. The first of such cavity passageways is formed by vertically-oriented walls and a bottom, for containing an eyelet screw. A bar is provided at the bottom, in alignment with the first passageway for supporting the screw eyelet to which a hanger wire is to be threaded. The second of such cavity passageways is formed crosswise of the first, and includes tapering walls which converge upwardly to the top of the head, diverging downwardly to a point on the outer wall, however, not extending to the plane of the bottom of the head, but rather terminating some distance above the disposition of the bottom. Corresponding openings between such terminations and the bottom communicate with the second passageway so that a wire can be threaded through the screw's eyelet mounted in the first passageway. The magazine loader, utilized for storing wires in the apparatus prior to their utilization as hangers, includes doorways to a chamber for ingress and egress for the wires, these doorways correspondingly communicating with the noted openings. The utilization of the head in operation of the apparatus effects a tightly wound looped arrangement of wire hanger to eyelet, eliminating any play in a loop about its eyelet, and thus along the length of the wire hanger, thereby assuring that a false-ceiling frame and its ceiling members are properly and permanently installed in its level position in view of many wire hangers being used in a single false-ceiling installation.

11 Claims, 8 Drawing Figures

HEAD AND MAGAZINE LOADER ASSEMBLY

TECHNICAL FIELD

This invention is directed to hanging of wires to a ceiling in order to levelly support false ceiling frames or the like, and in particular, to a cavity-configured head mounted on a wire magazine loader for an apparatus which drives a screw into a ceiling member, and by which head a wire hanger is effectively tightly wound to the screw.

BACKGROUND ART

See the following U.S. Pat. Nos. 295,880; 882,937; 1,125,417; 3,024,682; and 3,030,984.

PROBLEMS IN PRIOR ART PRACTICES

In the mounting of false ceiling frames to and below a wooden beam or the like in the ceiling itself, a multitude of wire hangers are utilized to hang such false ceiling frames. Each wire hanger hangs from an eyelet of a screw threaded into the beam member. As they hang down in straight length-wise fashion, the false frame is connected to the many free-hanging ends of the wire hangers. However, the false frame has sagged, not remaining in its proper leveled position because the wound looped arrangement of each wire hanger to its screw eyelet is loose and not tight thereabouts. This looseness varies from arrangement to arrangement. Consequently, forces and false-frame weight pull on the wire hangers to cause unlevelness in the false frame and its ceiling. An unattractive ceiling appearance results. Maintenance services are compounded, adding to costs in upkeep and replacement.

The state-of-the-art recessed heads now in use provide for a ring securely mounted, such as by welding, at the top of a cross-slotted right cylindrical member, however, this construction contributes to such looseness and does not relieve it in the resulting wound loop arrangement between wire hanger and eyelet.

The present invention solves the problem of looseness and provides a tightly wound loop arrangement of wire hanger to screw eyelet, thereby eliminating the different distances or lengths that develop in the many lengths of hung wire hangers, and assures continuance of a levelled false frame and its ceiling.

SUMMARY OF THE INVENTION

The essence of this invention is found in the construction or configuration of the elements in the head of a driver apparatus utilized in securing screws in wooden-members and to its relationship with the driving apparatus itself. The invention comprises a head member having a top and an outer wall which encompases a cavity that forms crossed passageways extending to the top, openings in the outer wall communicating with cavity, atmosphere and magazine loader. The first of such cavity passageways is formed by vertically-oriented walls and a bottom, for containing an eyelet screw. A bar is provided at the bottom, in alignment with the first passageway for supporting the screw eyelet to which a hanger wire is to be threaded. The second of the cavity passageways is formed crosswise of the first, and includes tapering walls which converge upwardly to the top of the head, diverging downwardly to a point on the outer wall, however, not extending to the plane of the bottom for the head, rather terminating some distance above the disposition of the bottom. Corresponding openings between such termination and the bottom communicate with the second passageway so that a wire can be threaded through the screw's eyelet mounted in the first passageway. The magazine loader, utilized for storing wires in the apparatus prior to their utilization as hangers, includes doorways to a chamber for ingress and egress of the wires, these doorways correspondingly communicating with the noted openings. The utilization of the head in operation of the apparatus effects a tightly wound looped arrangement of wire hanger to eyelet, eliminating any play in a loop about its eyelet, and thus along the length of the wire hanger, thereby assuring that the false ceiling frame and its ceiling members are properly and permanently installed in its level or position in view of many wire hangers being used in a single false-ceiling installation.

An object of this invention is to provide a novel and improved driver-apparatus head by which a tightly wound-looped arrangement of a wire hanger and eyelet is achieved.

Another object of this invention is to provide a novel and improved assembly of such head and its wire magazine loader.

A further object of this invention is to achieve consistency and permanency in a level disposition or position for a hung false-ceiling frame and its ceiling panels acoustical and otherwise.

A still further object of the invention is to prevent sagging of false-ceiling frames and their ceiling panels.

Another object of this invention is to reduce the need for maintenance and upkeep on a false ceiling frame and its ceiling member mounted therein, by reason of such consistency and permanency.

A further object of this invention is the saving of lengths of wire and attendant costs therewith by reason of using a known short length of wire as distinguished from a short length of wire of indiscriminate length.

Another object of this invention is to relieve or eliminate binding of the wire to the head during the production of a wound-looped arrangement while carrying out the invention and which bindings occurs with state-of-the-art heads, such binding contributing to looseness of the wound-looped arrangement about a screw eyelet.

A further object of the invention is to achieve a precise or tightly wound-looped arrangement about the screw eyelet.

Another object of the invention is to maintain the levelness of the dropped false-ceiling frame upon application of weight, such as acoustical ceiling panels or the like mounted to such a frame.

These and other objects and advantages of the invention will become more apparent by a full and complete reading of the following description, the appended claims thereto, and the accompanying drawing comprising two (2) sheets of seven (7) FIGURES.

BEST MODE FOR CARRYING OUT THE INVENTION

Figure 1:
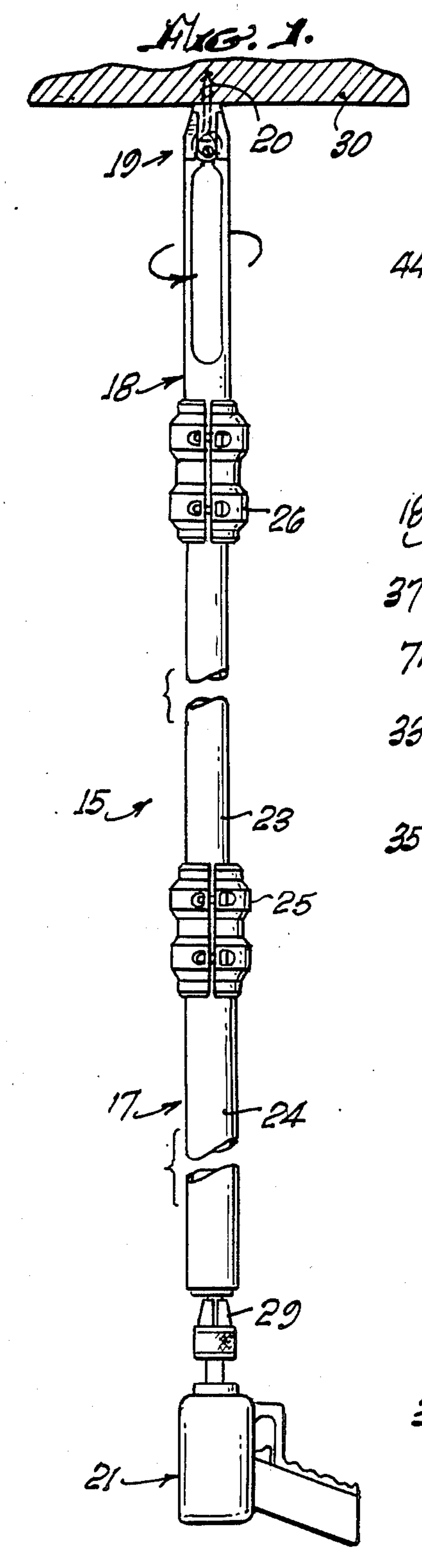
FIG. 1 is a full view of the invention as utilized in a screw driving apparatus.
Figure 2:
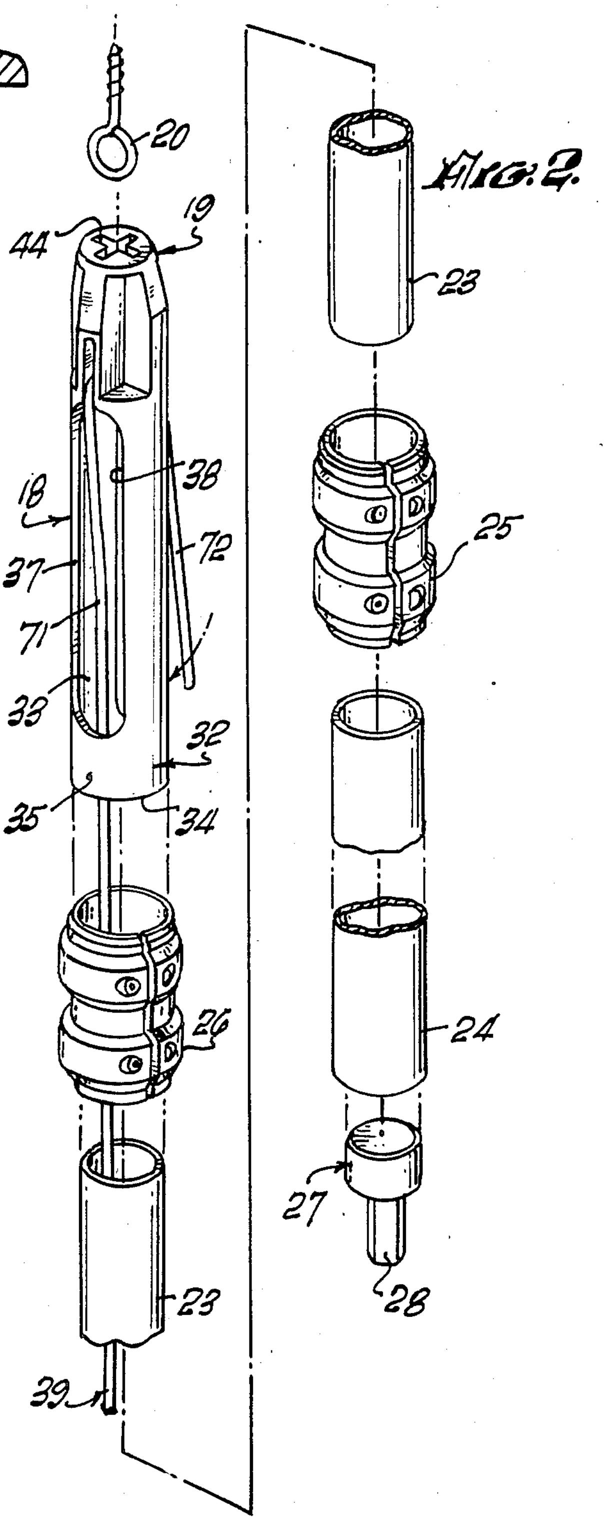
FIG. 2 is an exploded perspective view of the apparatus illustrated in FIG. 1.
Figure 4:
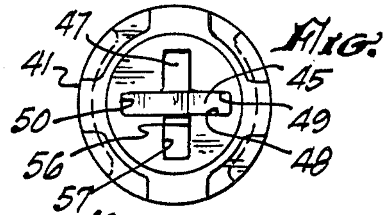
FIG. 4 is a top end view of the subject matter illustrated in FIG. 3.
Figure 3:
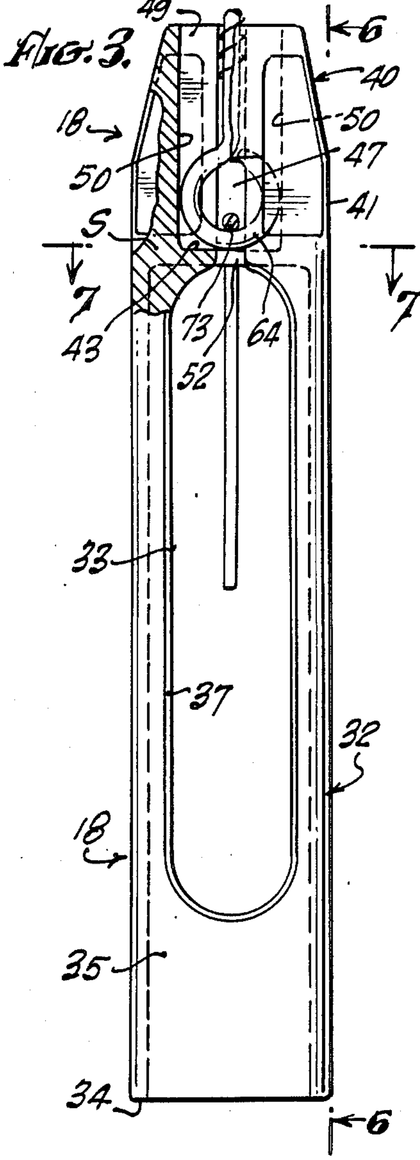
FIG. 3 is an elevational view, partly in section, of the subject matter of this invention.

Referring now to the drawing wherein reference characters correspond to like numerals herinafter, FIG. 1 illustrates a driver apparatus 15 in whcih the invention is utilized. Apparatus 15 comprises a handle 17 at the one end of which a wire magazine loader 18 is securely mounted and on top of which a head 19 for containing an eyelet screw 20 in turn is securely mounted, while at the other end of handle 17 means 21 for rotating apparatus 15, such as an electric hand gun, is securely mounted to handle 17. The handle 17 illustrated in FIGS. 1 and 2 is the subject matter disclosed in my corresponding U.S. patent application, Ser. No. 567,232, filed Dec. 30, 1983, entitled A Driver Apparatus, such disclosure being incorporated herein by reference, for the purpose of showing what a driver apparatus 15 is and how it is operated to effect a connection between a wire hanger and an eyelet screw secured in a ceiling beam. This invention is directed to head 19 and its assembly with magazine loader 18 that are utilized in a driver apparatus, and it is to be understood that the present invention also is adaptable to other driver apparata, such as shown in the prior art teachings cited above. However, briefly, as to such an apparatus, handle 17 comprises a pair of telescopic tubes 23, 24 joined together by a first clamping sleeve 25, while a second clamping sleeve 26 securely mounted to the one end of tube 23 provides the means by which magazine loader 18 and head 19 are operatively connected to tube 23. At the other end of tube 24, a tang member 27, FIG. 2, is securely mounted so that its tang 28 can be gripped in a collet 29, FIG. 1, of the electric hand gun 21. When gun 21 is energized, tang member 27, handle 17, magazine loader 18 and head 19 turn as a single unit to thread eyelet screw 20 to a wooden or other ceiling member 30, FIG. 1, while concurrently forming a wire hanger that is applied in operative connection to eyelet screw 20.

Referring now more particularly to FIGS. 2–7, magazine loader 18 comprises an elongated, hollow member 32, preferably cylindrical, having a chamber 33 disposed below head 19. Chamber 33 extends to an annular rim 34 which constitutes the terminus of a mounting member 35 by which magazine loader 18 is secured via clamping sleeve 26 to handle 17. A pair of opposing doorways 37, 38 is formed between mounting member 35 and head 19 for ingress and egress of each wire 39 of a plurality stored in its hollow chamber 33.

Head 19, FIGS. 3–7, comprises a member 40 formed from a solid, rigid material configured within an outer wall 41, wall 41 being illustrated in a generally truncated-conical-cylindrical manner although not necessarily confined to such a nature. Member 40 comprises a top 42 from which ts solidity S extends downwardly within outer wall 41 and in which solidity S a cavity 44, FIG. 2, forms crossed passageways 45, 47 which extend upwardly to top 41. Passageway 45 is formed by vertically oriented walls 48, 49 joined by like opposing walls 50, walls 48, 49 being interrupted in their lengths by passageway 47. Passageway 45 bottoms out in the solidity S of head member 40 and includes a bar 52 extending across passageway 47 for mounting a screw 20 thereon.

Figure 6:
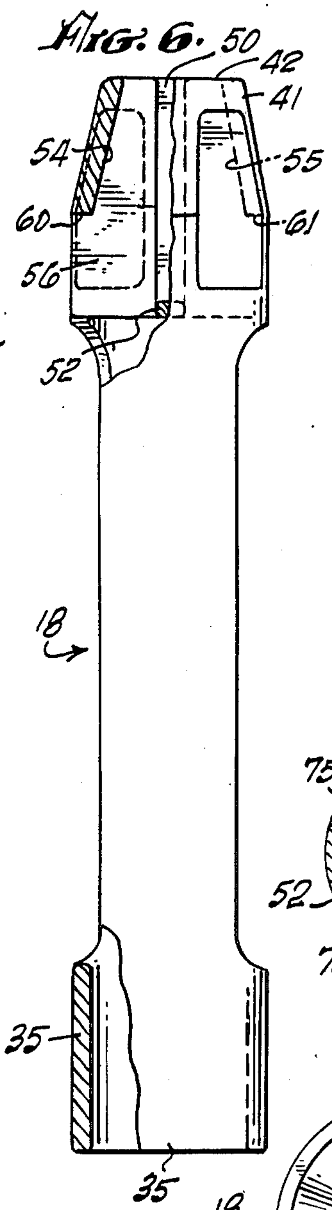
FIG. 6 is a view taken on line 6—6 of FIG. 3.

Passageway 47 is formed by opposing tapering walls 54, 55, FIG. 6, converging towards top 42 while joining its verticallyoriented walls 56, 57 which are interrupted by passageway 45. Each of tapering walls 54, 55 diverge downwardly in head 19 correspondingly terminating at points 60, 66, FIG. 6, on the latter's outer wall 41. Openings 62, 63, are formed in outer wall 41, beginning at points 60, 61, respectively, with each extending downwardly to communicate with doorways 37, 38, respectively, of magazine loader 18 while also communicating with the formed passageway 45. Openings 62, 63 are sufficiently long so that the eyelet 64 of screw 20 is visible therethrough and readily exposed or accessible for threading of a wire 39 therethrough in carrying out the operation of the invention.

Figure 8:
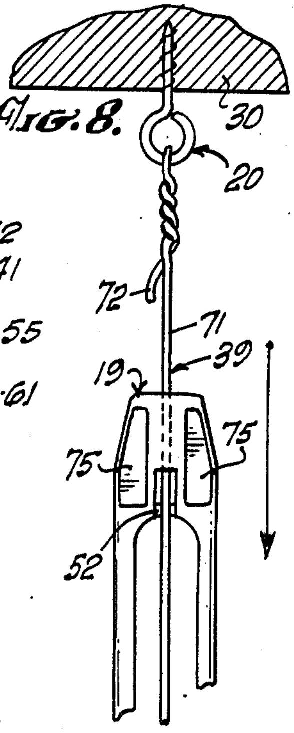
FIG. 8 is a view illustrating the results achieved by utilization of the invention.
Figure 7:
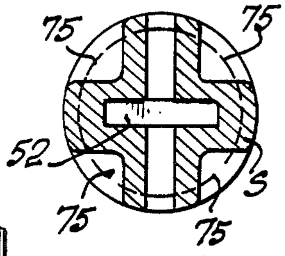
FIG. 7 is a view taken on line 7—7 of FIG. 3.
Figure 5:
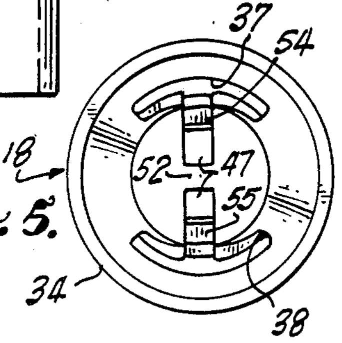
FIG. 5 is a bottom end view, enlarged, of the subject matter illustrated in FIG. 3.

In operation of the invention, a wire 39 having a long length 71 and a short length 72, FIG. 2, joined by its bend 73 (FIG. 3, and not visible in FIG. 2), is partially removed from storage chamber 33 so that short length 72 is inserted into opening 62 and threaded through the eyelet of a screw 20 mounted in passageway 45, to thence project out of its other opening 63, to hang in a fashion as shown in FIG. 2. In efficiency of operation, the end of short length 72 does not extend below the terminus of its adjacently disposed doorway 38, as the workman springs such short length 72 towards chamber 38, as shown by the arrow in FIG. 2, in the subsequent steps of use of apparatus 15. Threaded screw 20 is jammed into wooden beam 30, and gun 21 is energized, assuming that a complete assembly of the unit comprising handle, magazine loader with wire (s) and head are previously secured together. Screw 20 is threaded to beam 30 as apperatus 15 rotates. As the unit is slowly withdrawn from beam-secured screw 20, it continues to rotate and thereby develops a tightly (non-loose) wound looped arrangement of short length 72 about long length 71 as observed in FIG. 8. The tapering walls 54, 55 feather wire 39 as it feeds through head 19 during the lather's withdrawal from screw 20. This is in contrast to a binding of the wire atop a state-of-the-art head which comprises a ring welded to a cylindrical member having crossed slots extending to its outer wall and as disclosed in my presently pending application, Ser. No. 567,232, filed Dec. 30, 1983. The feeding of both lengths of wire 39 along tapering walls 54, 55 forces a smaller radius upon each loop being formed by the twisting or wrapping action of apparatus 15, and prevents a larger or loose loop from climbing over or around the eyelet of the screw during such action. Tightness of loop about eyelet results, and in turn defeats sagging that otherwise would be created for a false ceiling frame and its ceiling panels by reason of weight pulling on a loose looped arrangement. An additional advantage, too, is realized by saving wire as short length 72 now can be of known and not indiscriminate length.

The head and magazine loader is fabricated out of steel, such as 17-4 steel, and is so fabricated by using known investment casting processes and procedures, an example of which being the well-known "lost-wax" process. In this manner then, the unit is an integral one rather than being constructed by assembling or joining together, such as by welding, a head and a wire magazine loader or handle formed out a piece of tubing with a single doorway in it to gain access to its interior where wires are stored. By using the investment casting method, portions of head 19 can be recessed as at four (4) places 75, FIGS. 2, 7, thereby reducing its weight yet maintaining strength in the unit.

In the manufacturing of an integral assembly of head and magazine loader, the solidity S includes material below the bottoming out of the passageways 45, to constitute the means for securely mounting the head to the wire magazine loader. On the other hand, in the event the two pieces were first fabricated, such as by machining, welding could be used to affix or physically attached them together.

Industrial Applicability

The invention is used in the construction of false ceilings in buildings, usually acoustical but not limited thereto. However, it can be used wherever there is a need for hanging a wire whose length is required to remain the same.

Various changes and modifications can be made in the invention without departing from the spirit and scope of the appended claims hereto. For example, bar 52 may be omitted, as it will be obseved that without it, eyelet 64 nevertheless can rest on the bottomed out surfaces in the solidity S of head 19 and which form the lower terminus for passageway 45, as long as openings 62, 63 continue to provide access to wire 39 for threading through the eyelet of a screw 20 during operation of the invention. Only one doorway 37, rather than both doorways, may be formed in magazine loader 18. Further, mounting member 35 on magazine loader 18 is adaptable for direct mounting to means 21, such as an electric hand gun, in some uses.

I claim:

1. In a head utilized in a driver apparatus for securing a wire hanger to a beam or the like by means of an eyelet screw to which the wire hanger is applied in a tightly wound looped arrangement, the head comprising a member formed of a rigid, solid material within an outer wall and having a top and including a cavity forming crossed passageways extending to the top, the first of such cavity passageways formed by vertically-oriented walls and a bottom for containing the eyelet screw, the improvement comprising tapering walls converging to the top and in opposing relationship to each other included in the second of such cavity passageways, the tapering walls diverging away from the top to terminate at corresponding opposing portions of the outer wall of said member and at which terminations corresponding openings in said outer wall are formed communicating with the first of such cavity passageways and the atmosphere, the openings being above the plane of the first passageway's bottom so that a wire passes through one of such openings threading through the screw's eyelet and thence projected out of the other one of such openings.

2. In the improvement of claim 1, a bar mounted in alignment with and at the bottom of the first of such cavity passageways.

3. The improvement of claim 1 or claim 2 including means for securely mounting the head member to a wire magazine loader.

4. The improvement of claim 3 wherein said magazine loader includes at least one doorway through which a wire stored in its magazine egresses for introduction thereof into one of the openings in the head member.

5. A head utilized in a driver apparatus for securing a wire hanger to a beam or the like by means of the screw to which the wire hanger is applied in a tightly wound loop arrangement, said head comprising a top and outer wall in a member forming said head, said member being of a rigid, solid material within it outer wall and including a cavity forming crossed passageways extending to said top, the first of such cavity passageways formed by vertically-oriented walls and a bottom adapted to contain an eyelet screw, said head member including a bottom for the first of such cavity passageways, tapering walls converging towards the top and in opposing relationship to each other included in the second of such passageways, said tapering walls diverging away from the top to terminate at corresponding opposing portions of said outer wall of said member and at which terminations corresponding openings in said outer wall are formed communicating with the first of such passageways and atmosphere, such openings being above the plane of said base so that a wire passes through one of such openings to be threaded through a screw eyelet supported by said base and thence projected out of the other one of such openings.

6. The head of claim 5 including a bar mounted in alignment with and at the bottom of the first of such cavity passageways.

7. The head of claim 5 or claim 6 including means for securely mounting the head member to a wire magazine loader.

8. The head of claim 5 or claim 6 wherein said magazine loader includes at least one doorway through which a wire stored in its magazine egresses for introduction thereof into one of the openings in the head member.

9. The head of claim 8 including means for securely mounting the head member to a wire magazine loader.

10. A head and wire magazine loader assembly for a screw driving apparatus or the like comprising a head member having a top and being of a rigid, solid material within an outer wall thereof and including (a) a cavity forming crossed passageways extending to said top, the first of such cavity passageways formed by vertically-oriented walls and a bottom adapted to contain an eyelet screw, (b) tapering walls converging towards said top and in opposing relationship to each other included in the second of such passageways, said tapering walls diverging away from the top to terminate at corresponding opposing portions of said outer wall of said member and at which terminations corresponding openings in said outer wall are formed communicating with the first of such cavity passageways, such openings being above the plane of the bottom, a wire magazine loader comprising (a) a hollow member having at least one doorway communicating with a chamber formed in said hollow member, (b) means for mounting said assembly to a screw driving apparatus or the like, said at least one doorway being in communication with a corresponding one of the openings in said outer wall, said head member being secured to said magazine loader.

11. The assembly of claim 10 including a bar mounted in alignment with and at the bottom of the first of such cavity passageways.

* * * * *

UNITED STATES PATENT AND TRADEMARK OFFICE
CERTIFICATE OF CORRECTION

PATENT NO. : 4,689,881

DATED : Sep. 1, 1987

INVENTOR(S) : James C. Fall

It is certified that error appears in the above-identified patent and that said Letters Patent is hereby corrected as shown below:

In col. 6, at line three, "it" should be read as -- its --.

Signed and Sealed this

Ninth Day of February, 1988

*Attest:*

DONALD J. QUIGG

*Attesting Officer* *Commissioner of Patents and Trademarks*